(12) United States Patent
Weimer et al.

(10) Patent No.: US 10,166,729 B2
(45) Date of Patent: Jan. 1, 2019

(54) DEVICE FOR CONSOLIDATING A PREFORM

(71) Applicant: Airbus Defence and Space GmbH, Ottobrunn (DE)

(72) Inventors: Christian Weimer, München (DE); Franz Engel, München (DE); Tilman Orth, München (DE)

(73) Assignee: Airbus Defence and Space GmbH (DE)

( * ) Notice: Subject to any disclaimer, the term of this patent is extended or adjusted under 35 U.S.C. 154(b) by 4 days.

(21) Appl. No.: 14/976,915

(22) Filed: Dec. 21, 2015

(65) Prior Publication Data

US 2016/0176100 A1 Jun. 23, 2016

(30) Foreign Application Priority Data

Dec. 22, 2014 (DE) .................. 10 2014 018 933

(51) Int. Cl.
*B29C 70/42* (2006.01)
*B29B 11/16* (2006.01)
(Continued)

(52) U.S. Cl.
CPC .............. *B29C 70/42* (2013.01); *B29B 11/16* (2013.01); *B29C 70/34* (2013.01);
(Continued)

(58) Field of Classification Search
CPC ......... B29C 70/42; B29C 70/34; B29C 70/38; B29C 33/044; B29C 66/663;
(Continued)

(56) References Cited

U.S. PATENT DOCUMENTS 3,959,567 A * 5/1976 Bradley .................. B29C 59/14
428/461
5,830,809 A * 11/1998 Howard .................. B32B 27/06
428/405
(Continued)

FOREIGN PATENT DOCUMENTS

CA 2870345 A1 * 10/2013 ............. B29B 11/16
DE 2154117 A1 5/1973
(Continued)

OTHER PUBLICATIONS

Merriam-Webster Online Dictionary. "array." Dec. 27, 2016. Merriam-Webster Online.*
(Continued)

*Primary Examiner* — Seyed Masoud Malekzadeh
*Assistant Examiner* — Sonny V Nguyen
(74) *Attorney, Agent, or Firm* — Lerner, David, Littenberg, Krumholz & Mentlik, LLP

(57) ABSTRACT

A device for consolidating a thermoplastic preform, in particular a carbon fiber thermoplastic preform includes a heating element, e.g., an LED array, for heating the preform and a consolidation element, e.g., a consolidation roller, for exposing the preform to pressure and for cooling the preform. In order to consolidate the preform, the heating element and consolidation element are arranged and movable relative to each other in such a way that the preform can be exposed to pressure and cooled by the consolidation element after heated by means of the heating element.

7 Claims, 2 Drawing Sheets

(51) Int. Cl.
    *B29K 105/00*     (2006.01)
    *B29K 105/12*     (2006.01)
    *B29K 307/04*     (2006.01)
    *B29L 31/00*      (2006.01)
    *B29K 101/12*     (2006.01)
    *B29C 70/34*      (2006.01)
    *B29K 105/08*     (2006.01)

(52) U.S. Cl.
    CPC ...... *B29K 2101/12* (2013.01); *B29K 2105/08* (2013.01); *B29K 2105/12* (2013.01); *B29K 2105/253* (2013.01); *B29K 2307/04* (2013.01); *B29L 2031/7739* (2013.01)

(58) Field of Classification Search
    CPC ..... B29C 70/386; B29C 70/388; B29B 11/16; B29K 2015/00; B29L 2031/7739
    USPC .............................................. 156/380.9, 322
    See application file for complete search history.

(56) References Cited

U.S. PATENT DOCUMENTS

| | | | |
|---|---|---|---|
| 2005/0172465 A1 | 8/2005 | Duval | |
| 2006/0048881 A1* | 3/2006 | Evans | B29B 11/16 156/64 |
| 2006/0108048 A1* | 5/2006 | Engelbart | B29C 70/38 156/64 |
| 2006/0233990 A1* | 10/2006 | Humphrey | B29C 43/222 428/36.9 |
| 2007/0000606 A1* | 1/2007 | Steelman | B29C 63/0073 156/322 |
| 2007/0175573 A1* | 8/2007 | Fox | B29C 70/34 156/196 |
| 2007/0241478 A1* | 10/2007 | Buckley | B29B 11/16 264/257 |
| 2008/0157437 A1* | 7/2008 | Nelson | B29C 70/38 264/405 |
| 2008/0289743 A1* | 11/2008 | Tsotsis | B29B 11/16 156/93 |
| 2008/0302483 A1* | 12/2008 | Vaniglia | B29C 70/384 156/361 |
| 2009/0169056 A1* | 7/2009 | Engelbart | B29C 70/38 382/106 |
| 2011/0005412 A1* | 1/2011 | Fujii | B29C 59/04 101/216 |
| 2011/0011537 A1* | 1/2011 | Hamlyn | B29C 70/384 156/436 |
| 2012/0073749 A1* | 3/2012 | Naumann | B29C 70/38 156/322 |
| 2012/0186730 A1* | 7/2012 | Shindo | B29C 70/38 156/160 |
| 2012/0328846 A1* | 12/2012 | Blot | B29B 11/16 428/175 |
| 2015/0314522 A1 | 11/2015 | Witzel et al. | |
| 2017/0151731 A1* | 6/2017 | Ho Yew Chi | B29C 70/38 |

FOREIGN PATENT DOCUMENTS

| | | |
|---|---|---|
| DE | 102009008329 B4 | 7/2011 |
| DE | 102010010512 A1 | 9/2011 |
| DE | 102012018231 A1 | 3/2013 |
| DE | 102011116119 A1 | 4/2013 |
| DE | 102012007439 A1 | 10/2013 |
| DE | 102012218186 A1 | 4/2014 |
| EP | 1 844 914 A1 | 10/2007 |
| EP | 2 363 273 A1 | 9/2011 |
| EP | 2 730 385 A1 | 5/2014 |

OTHER PUBLICATIONS

Merriam-Webster Online Dictionary. "portal." Dec. 27, 2016. Merriam-Webster Online.*
Weinert Hans-Joachim, "Translation of DE 2154117 A1", translation created Aug. 22, 2017.*
Extended European Search Report dated Apr. 20, 2016 (EP 15 19 8779).

* cited by examiner

DEVICE FOR CONSOLIDATING A PREFORM

FIELD OF THE INVENTION

The present invention relates to a device for final consolidating a preform. Such devices are used in particular for manufacturing fuselage shells in aircraft construction.

BACKGROUND OF THE INVENTION

Known in this regard are so-called fiber placement systems, which are intended to yield an in-line consolidation of individual tapes directly to a deposition point. Problems can here be encountered with regard to the temperature distribution given multilayer constructs, which can lead to component distortion and an elevated pore content in the laminate. Laser systems are used in this field as the heating technology so as to achieve the necessary energy input, and a downstream autoclave or furnace process is provided, which can result in high operation and procurement costs.

Additionally known methods for the deposition of fibers include, e.g., automated fiber placement (AFP) and automated tape laying (ATL). A pre-impregnated semi-finished fiber product is here deposited by a machine head onto a component mold via rollers, the matrix material is fused through energy input, and the pressure required for consolidation is applied by way of a compactor roller, wherein this roller is simultaneously used for cooling, and hence consolidation. This method is used to build up the individual layers of components out of several parallel individual webs. These systems are used on an industrial scale to manufacture shell components for aircraft out of thermoset carbon fiber composite materials. Due to the thermoset matrix material, curing must here take place in an autoclave process. The described systems can usually deposit semi-finished products or preforms 2 with a width of 3 to 300 mm per web, as illustrated on FIG. 1. Therefore, it takes a long time to build up a complete shell element already before the necessary autoclave process.

BRIEF SUMMARY OF THE INVENTION

An aspect of the present invention may provide an especially economical device of the kind mentioned at the outset, which can be used to manufacture higher quality components with an optimized heat input at a higher productivity.

The device according to an embodiment of the invention is suitable in particular for the final consolidation of a thermoplastic preform, in particular a carbon fiber thermoplastic preform, which can be positioned in the device in a not yet finally consolidated state. In particular, an embodiment of the invention can be used for shell construction techniques or intermediate compacting, and comprises a heating element for heating the preform and a consolidation element for exposing the preform to pressure and cooling the preform. In order to consolidate the preform, the heating element and consolidation element are arranged and movable relative to each other in such a way that the preform can be exposed to pressure and cooled by the consolidation element after heated by means of the heating element.

The device according to an embodiment of the invention can be used as an advantageous alternative to a furnace or autoclave process within the framework of a downstream, final consolidation stage. The heating element makes it possible to at least regionally heat the typically large-surfaced preform, especially in a targeted, and preferably local, manner, wherein heating preferably take place over the entire cross section of the preform, for which a suitable heating element can be used, which makes it possible to input enough heat for consolidation into the laminate in provided regions. The consolidation element is set up to pressurize and cool a region heated by the heating element in such a way as to consolidate the preform.

The device according to an embodiment of the invention enables the manufacture of thermoplastic fuselage shells, wherein large-surfaced laminates with a very low pore content, and hence an elevated quality, can be fabricated. This makes it possible to introduce thermoplastic building approaches in fuselage construction techniques on a larger scale, so that assembly can be simplified and damage behavior can be improved, for example. Autoclaves and furnaces are unnecessary for final consolidation, because the heating element and consolidation element are set up to introduce a sufficient heat quantity into the preform or exert a sufficiently high pressure on the preform made out of thermoplastic material, and to sufficiently cool the latter. As a result, investment and operating costs can be lowered.

A first embodiment advantageously provides that the heating element be set up to heat the entire preform from one position. In addition, the consolidation element comprises a structure, e.g., a press, which is set up to simultaneously exert pressure on the entire preform and cool the entire preform for consolidation purposes. Such press technology envisages that the entire preform can be heated in a first step, and that consolidation can subsequently be performed by means of a correspondingly massive stamp.

Another embodiment provides that the consolidation element comprises at least one consolidation roller. The heating element and consolidation roller can be moved along the preform in such a way that the preform can be heated region by region with the heating element, and subsequently pressurized and cooled by the consolidation roller. In particular, this especially preferred combination of heating element and consolidation roller makes it possible to initially heat a respective region or section of the preform to be consolidated in advance, while the consolidation roller thereupon is rolled over the heated region, and supplies the pressurization and cooling necessary for the actual, final consolidation, wherein the design of the roller can be geared toward the complexity of the shell component. As shown on FIG. 2, a complete shell element can be built up significantly faster by comparison to prior art, since significantly wider semi-finished products or preforms 2 can be deposited, thereby helping to increase productivity.

For example, the heating element comprises light-emitting diodes (LED). The LED's are especially preferably combined into an LED array with a flat configuration. Such LED's or LED arrays represent an especially powerful heating system, which can yield considerable energy savings, in particular by comparison to conventional autoclaves and furnaces. Alternatively, laser systems can also be used, but in comparison to LED's take longer to regionally heat the preform as described above.

It can likewise be provided that the consolidation roller be guidable along the preform by means of a web guide, wherein the web guide can be adjusted to varying material thicknesses of the preform. It is especially preferably provided that the web guide comprises a guide groove and guide arm, wherein the consolidation roller and/or heating element are arranged on the guide arm.

Alternatively, the consolidation roller can also be guidable along the preform by means of a robot or portal, which in particular makes it possible to enhance the adaptability to various preforms to be consolidated.

In addition, the device can exhibit a sensor array for acquiring the pressure and/or temperature on a contact point, usually a nip point, of the consolidation element and preform, so as to improve the monitoring and control of the device.

In addition, the consolidation roller can comprise several roller segments or a flexible material, where contact with the preform is provided. This permits use even on components with multiple curves, or different pressures can be regionally exerted on the preform.

Further, two consolidation rollers can be moved along the preform by means of a guide roller. For example, two or many small consolidation rollers can thus be guided by a single guide roller, wherein the small consolidation rollers can be set to a specific contact pressure, e.g., with pneumatic cylinders, and the guide axis guides or moves the small consolidation rollers along the preform. Among other things, the advantage to the individual small consolidation rollers lies in the fact that specific consolidation force ramps and heat ramps can be realized, or that the rear consolidation rollers can cool instead of heat.

Another embodiment provides that the heating element be arranged inside the consolidation element, which can be transparent in design, thereby making it possible to save in particular on installation space.

BRIEF DESCRIPTION OF THE DRAWINGS

Exemplary embodiments of the invention will be described in greater detail below based on the attached drawings. Shown on:

FIGS. 1 and 2 were already discussed further above.

FIG. 3 shows an exemplary embodiment of a device 1 according to the invention for consolidating a thermoplastic preform, in this case a carbon fiber thermoplastic preform 2. The device 1 comprises a heating element in the form of a flat LED array 3 for heating the preform 2 and a consolidation element in the form of a consolidation roller 4 for exposing the preform 2 to pressure and for cooling the preform 2.

DETAILED DESCRIPTION

Figure 2:
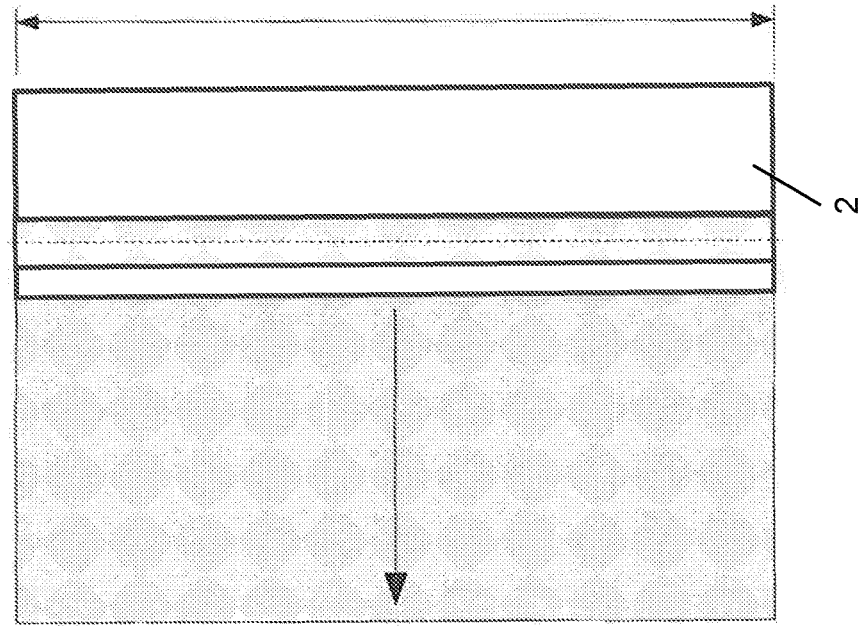
FIG. 2 is a way to deposit and consolidate a preform with an embodiment of a device according to an aspect of the invention.
Figure 1:
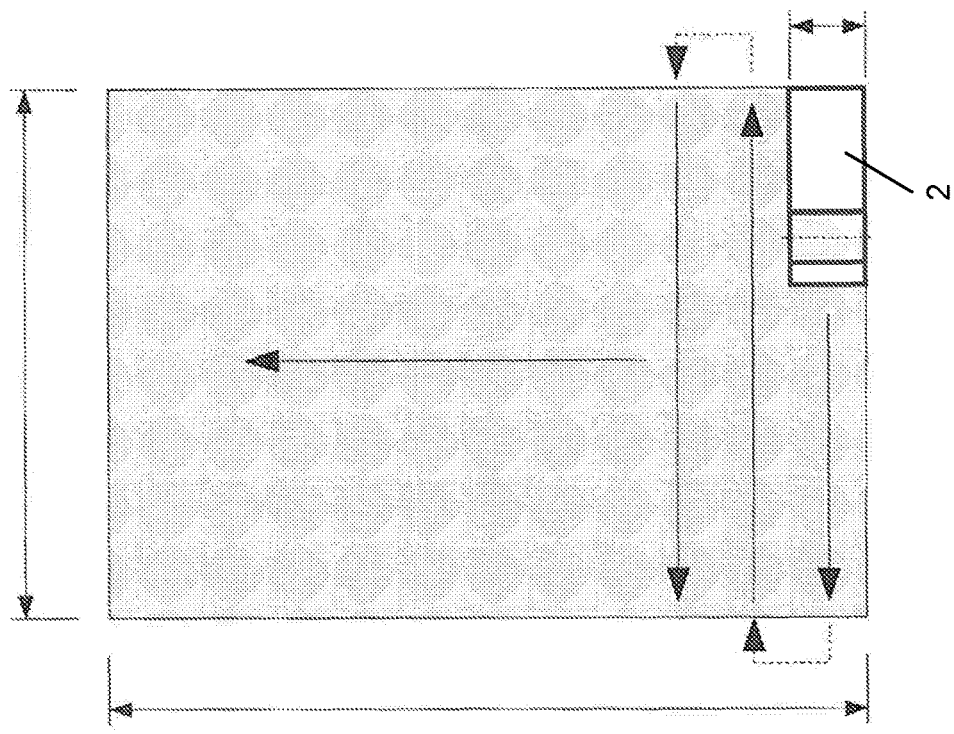
FIG. 1 is a way to deposit and consolidate a preform according to a known method.
Figure 3:
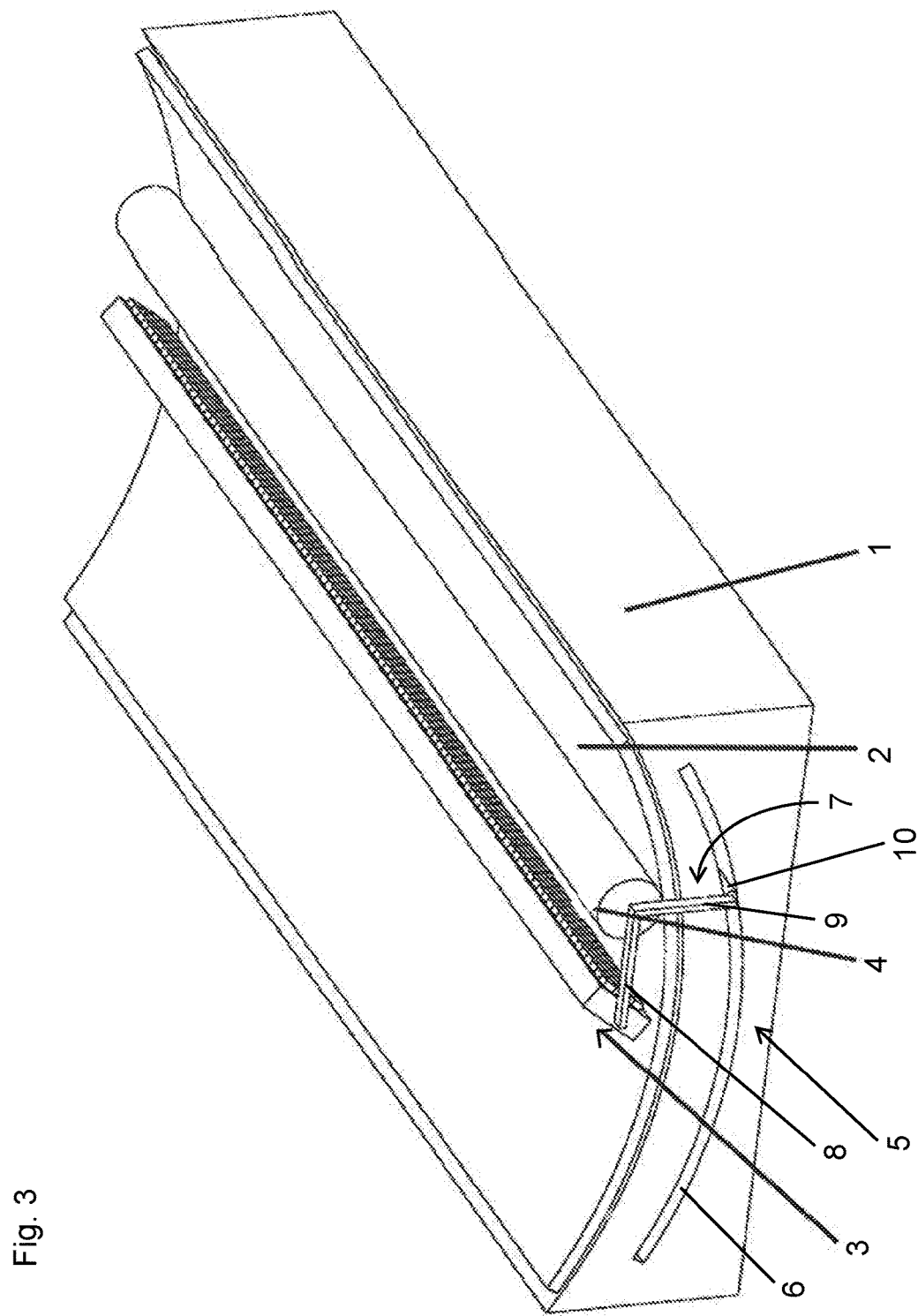
FIG. 3 is an exemplary embodiment of a device according to the invention in a schematic perspective view.

In order to consolidate the preform 2, the LED array 3 and consolidation roller 4 are arranged on a shared guide arm 7, which together with an arc-shaped guide groove 6 is part of a web guide 5. The guide arm 7 comprises a connecting part 8, whose opposing longitudinal ends have attached to them the LED array 3 and consolidation roller 4, which are spaced apart from each other. The consolidation roller 4 is here mounted in the connecting part 8 so that it can pivot around its longitudinal axis. The LED array 3 is secured to the connecting part 8 parallel to the guide roller 4 so that it can pivot around its longitudinal axis, so that the preform 2 is radiated at various angles, and can thus be heated at varying intensities.

In addition, the guide arm 7 exhibits a guide part 9 that is joined as a single part with the connecting part 8, and forms a right angle with the latter. The consolidation roller 4 is mounted at the height of the longitudinal end of the guide part 9 facing the connecting part 8. At its longitudinal end facing away from the connecting part 8, a driving element 10 is hinged in the guide part 9. The driving element 10 is set up to move along the guide groove 6, and thereby drive the guide arm 7, so that the LED array 3 and consolidation roller 4 move along the preform 2. The progression of the guide groove 6 and length of the guide part are selected in such a way that the consolidation roller 4 abuts against the preform 2 with a specific pressure, and rolls off the latter. In the present example, the preform 2 has the same material thickness all over. Deviating from the above, if a preform is to be consolidated with regionally varying material thicknesses, the progression of the guide groove can be altered accordingly, so as to correspondingly adjust the pressure exposure.

For consolidation purposes, the guide arm is moved in the direction of the LED array 3, so that a region of the preform 2 can initially be heated by means of the LED array, after which the region can be exposed to pressure and cooled by means of the consolidation roller 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for consolidating a thermoplastic preform, comprising:
    a heating element for heating the preform; and
    a consolidation element for exposing the preform to pressure and for cooling the preform,
    wherein, to consolidate the preform, the heating element and consolidation element are arranged and are movable relative to each other in such a way that the preform is exposed to pressure and cooled by the consolidation element after being heated by the heating element,
    wherein the consolidation element comprises at least two adjacent consolidation rollers,
    wherein the heating element and the consolidation rollers are configured and arranged to be moved along the preform in such a way that the preform is heated region by region by the heating element, and subsequently pressurized and cooled by the consolidation rollers,
    wherein the consolidation rollers are configured and arranged to be guided along the preform by a web guide,
    wherein the web guide comprises a guide groove and a guide arm, at least one of the heating element and the two consolidation rollers being arranged on the guide arm,
    wherein a shape of the guide groove corresponds to a shape of the preform and enables guiding the consolidation rollers along the shape of the preform, wherein the guide arm comprises a connecting part having a first longitudinal end and a second longitudinal end opposing the first longitudinal end, the heating element and the two consolidation rollers being attached to the first and second longitudinal ends, respectively, thereby being spaced apart from each other, wherein the guide arm further comprises a guide part joined to the connecting part at a right angle to form a single part, and the consolidation rollers are mounted at a first longitudinal end of the guide part facing the connecting part, wherein the guide part is, at a second longitudinal end facing away from the connecting part, hinged in the guide groove, and wherein the heating element is pivotably secured to the connecting part so that the heating element can pivot around a longitudinal axis of the heating element, so that the preform is radiated at various angles, and can thus be heated at varying intensities.

2. The device according to claim 1, wherein the heating element comprises light-emitting diodes (LEDs).

3. The device according to claim 2, wherein the LEDs are combined into an LED array with a flat configuration.

4. The device according to claim 1, wherein the web guide is adjusted to varying material thicknesses of the preform.

5. The device according to claim 1, wherein the device is configured for acquiring at least one of the pressure and temperature on a contact point of the consolidation element and preform.

6. The device according to claim 1, wherein the consolidation roller comprises several roller segments.

7. The device according to claim 1, wherein the consolidation roller comprises a flexible material, where contact with the preform is provided.

* * * * *